Oct. 5, 1954          H. E. CORBITT          2,691,104
CAPACITY CONTROLLED OSCILLATOR
Filed Oct. 21, 1949
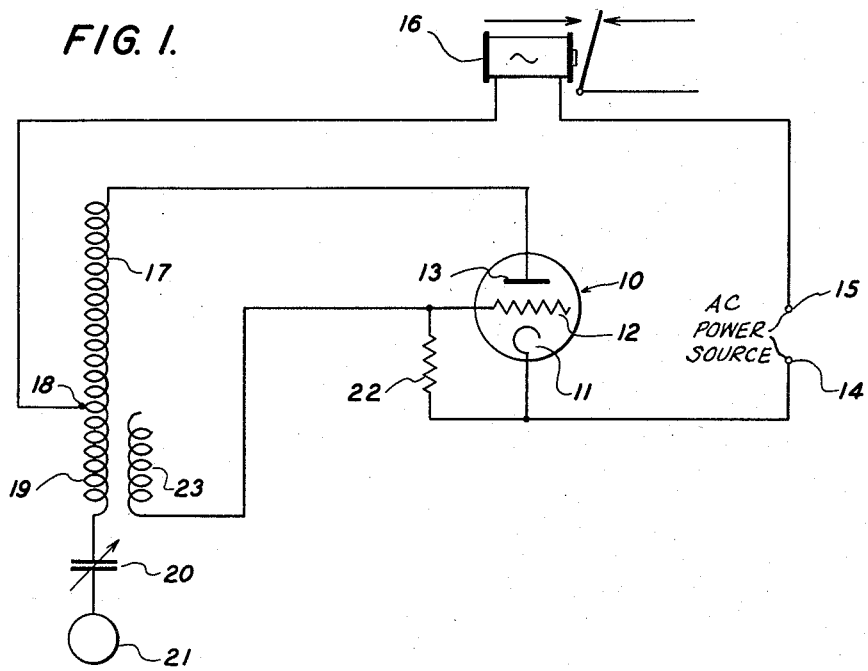
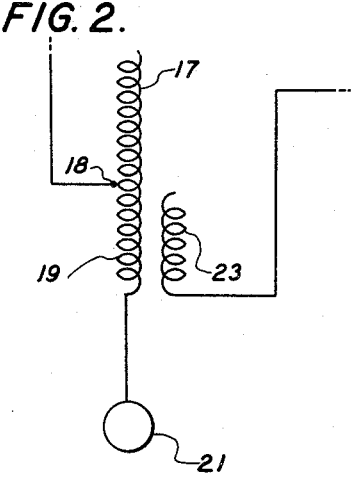
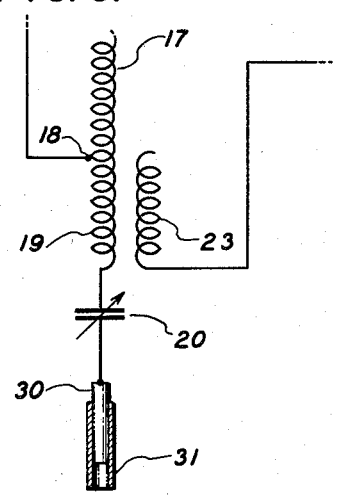
INVENTOR.
HOWARD E. CORBITT
BY
*James B Christie*
ATTORNEY Patented Oct. 5, 1954

2,691,104

UNITED STATES PATENT OFFICE 2,691,104

CAPACITY CONTROLLED OSCILLATOR

Howard E. Corbitt, San Gabriel, Calif.

Application October 21, 1949, Serial No. 122,750

4 Claims. (Cl. 250—36)

1

This invention is concerned with capacity controlled oscillation circuits and provides a novel vacuum tube oscillator circuit of this type which has application in a variety of fields.

The conventional capacity-controlled oscillator is energized with direct current. Normally the negatve side of the direct current source is grounded and the capacity control is connected to this side of the circuit. The capacity control oscillator of the instant invention is adapted for connection directly to the normally available alternating current supply, say a 110 volt line. This represents a substantial economy in installation for it avoids the necessity of rectifiers, etc. Moreover, in the preferred form of the apparatus of the invention the control capacity is arranged so that it is not metallically connected to the power source and if, as is usual, this control capacity is in the form of an exposed metal part, this part may be touched with safety or may be earthed accidentally without hazard.

In short, the invention provides an extremely safe and inexpensive capacity controlled oscillator circuit which may be used for the remote control of a variety of installations. Thus, it may be employed as the remote control for a door operating mechanism or in a variety of other installations. In brief, my invention contemplates the combination in a capacity controlled oscillator which comprises a vacuum tube having an anode, a cathode and a grid. The anode is connectable directly to one side of an A. C. power supply and the cathode is connectable directly to the other side of the supply. A first inductance is connected in series between the supply and the plate. A capacitance, which may be a condenser, or in some instances simply a metal plate or telescope, is provided and is connected on a free-ended branch or extension of the plate circuit. A grid bias resistor is connected between the grid and the cathode, and another inductance is disposed in inductive relationship with the first inductance (or an extension thereof in free-ended branch) with one of its ends connected to the grid and the other of its ends unconnected, the polarity of the connected end being such that oscillations set up in the circuit by the current tend to continue. In the preferred form of the device, a condenser is employed and the side of the condenser which is not connected to the inductance is exposed. By waving the hand over this exposed side, or by touching it, the capacity of the condenser is changed and causes the oscillation of the circuit to cease. This phenomenon is employed to actuate a relay or other load disposed in the circuit

2 either between the power source and the cathode or between the power source and the anode. The use of a condenser is preferred, since its unconnected side may be touched without hazard of electrical shock. However, the condenser may be omitted and a metal plate or other conductive apparatus such as a set of conductive telescoping tubes may be employed to vary the capacitance of the circuit in substantially the same manner as the condenser. These and other aspects of the invention will be understood more thoroughly in the light of the following detailed description taken in conjunction with the accompanying drawing, in which:

Fig. 1 is a wiring diagram of a preferred form of the circuit of the invention;

Fig. 2 is a fragmentary view of a modified form of the apparatus of Fig. 1; and

Fig. 3 is another fragmentary drawing illustrating a further modification of the circuit of Fig. 1.

Referring to Fig. 1, the circuit illustrated includes a vacuum tube 10 having a cathode 11, a grid 12 and a plate 13. If desired, the cathode may be heated by a separate filament (not shown). The cathode is connected directly to one side of a conventional A. C. power supply, say 110 or 150 volts, through a contact 14. The other side of the power supply is connected through a contact 15 to the plate. Thus a load 16, say a coil of a relay operated switch is connected between the contact 15 and the plate in series with an induction coil 17. A second induction coil or an inductance extension 19 is connected at one end to the first induction coil through a common point 18 and at its other end to a variable condenser 20. The free side of the variable condenser is connected to a metallic plate 21 which is in fact an extension of the condenser. Thus the coil 19, the condenser 20 and the condenser extension or capacity control 21 form a free-ended branch of the plate circuit.

A grid bias resistor 22 is connected between the cathode and the grid and a third inductance coil 23 is disposed in inductive relationship with the inductance extension 19. One end of this third inductance coil is unconnected; the other end is connected to the grid of the tube.

The operation of the apparatus of Fig. 1 is as follows:

Assume that the contact 15 to the power line is positive at the moment and that the contact 14 is negative, and that the heater filament (not shown for purposes of simplicity) is energized from the same or a different source of power. The plate of the tube is positive under these circumstances and attracts electrons emitted by the cathode. After entering the plate, the electrons pass downward (as shown in Fig. 1) through the first induction coil, out through the mid point or tap 18, and back through the load and the power source to the cathode, thus completing a circuit which for convenience has been termed the plate circuit. At the moment that the electrons begin to flow downward in the first induction coil, they produce a magnetic field which sweeps through the second induction coil (induction coil extension) and thereby induce a flow of electrons in this second coil. In accordance with Lenz's law the induced flow of electrons in the second induction coil will be in an upward direction (as viewed in Fig. 1), i. e. opposite to the direction of electron flow in the first or main induction coil. The second and third induction coils 19, 23, are in inductive relationship with each other, i. e. magnetic coupling exists between them. Since the bottom of coil 23 is connected to the grid of the vacuum tube the grid becomes positively charged, at the same time that the free end of the coil 23 becomes negatively charged, in accordance with Lenz's law.

Since the polarity of the charge on the grid of the tube is positive, the flow of electrons to the plate is increased by this positive charge. In consequence, there is an increased electron flow downward through the first induction coil 17 and this increases the strength of the magnetic field of this coil. This field sweeps through the second or extension induction coil 19 and induces an even greater flow of electrons upward through this second coil. As before, the increased upward flow of electrons through the second coil induces an even greater positive charge on the tube as a result of the coupling of the induction coils 19, 23. This results in an even greater plate current and the interaction just described continues until the plate current attains a certain maximum or saturation value determined by the tube characteristics, the circuit constants and the value of the grid resistor 9.

When the saturated condition just described is attained the flow of current through the first induction coil becomes steady. The magnetic field of this induction coil no longer increases and hence no longer induces the current in the second or extension induction coil. Thus the flow of electrons upwardly in the second induction coil is stopped completely and the magnetic field of this second induction coil collapses. When this happens, there is in accordance with Lenz's law, an upward flow of electrons causing the grid to become less positive. At the same time, the interelectrode capacitance of the tube (consisting of the positively charged plate and the less positively charged grid) tends to discharge through the first and second induction coils and, of course, through the magnetic coupling and the third induction coil to the grid. The effect of this collapsing magnetic field of the second induction coil and of the capacitance discharge which it occasions is to make the grid still less positive, the two effects being in the same direction. Therefore, the plate current decreases. The resulting decrease in the electron flow through the first induction coil induces a downward flow of electrons in the second induction coil. This furthers the collapse of the already collapsing magnetic field in this coil and in turn further decreases the positive charge on the grid and eventually causes the grid charge to become negative. At the same time, the flow of plate current through the first induction coil decreases.

The process just described is repeated many times until the grid acquires a large negative charge that prevents any electron flow to the plate. When this happens the plate current drops to zero. This is the condition of the circuit that existed when it was first energized, so the plate again becomes positive and attracts electrons emitted by the cathode. All of the foregoing steps are then repeated with the result that a high frequency alternating current flow is maintained in all of the induction coils.

It will be plain that grid bias is supplied by the potential drop through the grid resistor 22. The plate current for oscillation is at a minimum due to this bias voltage.

Because self-bias is employed the oscillator is self-starting.

The condenser, which preferably is variable, is connected to the bottom end of the induction coil extension 19 in the free-ended branch of the plate circuit (as shown in Fig. 1). And the opposite side of the condenser is connected to the metallic conductor 21 which may be a bare metal plate. If the finger is placed upon either plate of the condenser the electrical value of the coil 19 and the coupling between the coils 19 and 23 is radically changed. When this happens no bias is developed at the grid of the tube and the plate current increases to a maximum value determined by the circuit constants, plate voltage, tube type, and the value of the load 16. This increase in plate current energizes the relay coil sufficiently to throw the switch which controls a device (not shown), for example, a motor. If only the lower plate of the condenser is touched, there is no shock hazard, since there is no metallic connection with the plate circuit. If instead of touching the lower plate of the condenser the metal plate 21 is touched a like result is obtained. By proper sensitivity adjustment the same result may be obtained by simply approaching the lower condenser plate or preferably the other metallic plate 21 with the hand, since this changes the capacitance of the circuit, and brings about the changes in current flow in the circuit already described.

The sensitivity of the capacity controlled oscillator may be varied by adjusting the setting of the variable condenser, for example, by adjusting the relative positions of the two condenser plates. The lower condenser plate is not metallically connected to the oscillator circuit and may therefore be exposed without shock hazard. The same is true with plate 21 which may be called the capacity operator plate.

It is not necessary to ground either side of the power circuit nor is a transformer between the power source and the oscillator required, always provided that the tube is such that it will operate at the line voltage without damage.

No rectifier, either full or half wave, is required, since the oscillator operates on the portion of the power wave that makes the plate positive and the cathode negative.

If desired, the condenser may be eliminated from the circuit, as shown in Fig. 2 with the so-called capacity operator plate 21 connected directly to the bottom of the second induction coil 19. If the hand is placed on the plate 21, the capacity of the circuit is changed so that it ceases to oscillate. The current flow through the load is thus increased to an extent sufficient to bring about operation of the load controlling device, say the solenoid operated switch. The objection to the modification illustrated in Fig. 2 is that by eliminating the condenser the capacity operator 21 becomes metallically connected and thus will subject an operator to shock if the capacity operator is touched.

Fig. 3 illustrates a preferred modification in which the capacity or operator controller is in the form of a set of telescoped metallic tubes 30, 31 slidable lengthwise one upon the other. By increasing the aggregate length of the telescoped tubes the sensitivity of the circuit may be adjusted. If the condenser 20 is connected between the capacity controller and the rest of the circuit this sensitivity adjustment may be made while the circuit is energized, since no shock hazard is involved.

For low cost construction it is preferable to employ a vacuum tube in which both plate and filament heater voltages are taken directly from a commercial power line.

Various power tubes may be employed in the construction of the devices of my invention. As already indicated, for low cost construction they should be such as to be energized directly by commercial A. C. current, say 110 or more volts.

Provided that the power tube has sufficient output, various types of loads may be inserted in the circuit. Thus solenoid valves, spring loaded solenoid devices, small motors and lamps may be energized directly. This eliminates relaying and amplifying equipment and reduces construction cost.

The capacity controlled oscillator of the invention is particularly suitable for use in computing machines and the like where space restrictions as well as cost may prevent the installation of the conventional transformer and amplifier and more than one tube. However, as already indicated, the apparatus of the invention is generally applicable for remote control purposes.

I claim:
1. In a capacity controlled oscillator, the combination which comprises a vacuum tube having an anode, a cathode, and a grid, means including a first inductance for connecting the anode to one side of an alternating current power supply, means for connecting the cathode directly to the other side of the alternating current power supply, an extension inductance, a condenser, the extension inductance being connected in series between the first inductance and one side of the condenser, a normally ungrounded conductive condenser extension connected to the other side of the condenser, a grid bias resistor connected between the grid and the cathode, and a third inductance disposed in inductive relationship with one of the other inductances with one end connected to the grid and the other end unconnected, the polarity of the connected end being such that oscillations set up in the circuit by the current tend to continue.

2. Apparatus according to claim 1 in which the condenser extension is a set of telescoped members slidable lengthwise one upon the other.

3. Apparatus according to claim 1 in which the condenser extension is a metallic plate.

4. In a capacity controlled oscillator, the combination which comprises a vacuum tube having an anode, a cathode, and a grid, means including a first inductance connected to the anode and a relay serially connected with the first inductance for connecting the anode to one side of an alternating current power supply, means for connecting the cathode to the other side of the alternating current power supply, a conductive member, a second inductance connected in series between the first inductance and the conductive member, a grid bias resistor connected between the grid and the cathode of the tube, and a third inductance disposed in inductive relationship with one of the other inductances with one end of the third inductance connected to the grid of the tube and the other end unconnected, the polarity of the end of the third inductance which is connected to the grid of the tube being such that oscillations set up in the circuit tend to continue.

References Cited in the file of this patent

UNITED STATES PATENTS

| Number | Name | Date |
| --- | --- | --- |
| 2,355,606 | Shannon | Aug. 15, 1944 |
| 2,468,138 | Terry | Apr. 26, 1949 |
| 2,505,577 | Rich | Apr. 25, 1950 |

FOREIGN PATENTS

| Number | Country | Date |
| --- | --- | --- |
| 305,508 | Great Britain | Jan. 30, 1929 |
| 62,809 | Denmark | Oct. 16, 1944 |